US012719820B2

(12) United States Patent
Jayaraman et al.

(10) Patent No.: US 12,719,820 B2
(45) Date of Patent: Aug. 25, 2026

(54) SYSTEM AND METHOD FOR PERSONALIZATION OF A CHAT BOT

(71) Applicant: Truist Bank, Charlotte, NC (US)

(72) Inventors: Barath Jayaraman, Fort Mill, SC (US); Alex Heath Misiaszek, Cornelius, NC (US)

(73) Assignee: TRUIST BANK, Charlotte, NC (US)

( * ) Notice: Subject to any disclaimer, the term of this patent is extended or adjusted under 35 U.S.C. 154(b) by 562 days.

(21) Appl. No.: 18/054,938

(22) Filed: Nov. 14, 2022

(65) Prior Publication Data

US 2024/0163232 A1 May 16, 2024

(51) Int. Cl.

| | |
|---|---|
| ***H04L 51/02*** | (2022.01) |
| ***G06F 40/30*** | (2020.01) |
| ***G06N 20/00*** | (2019.01) |
| ***H04L 9/40*** | (2022.01) |
| ***H04L 51/52*** | (2022.01) |
| ***H04L 67/306*** | (2022.01) |

(52) U.S. Cl.

CPC .............. *H04L 51/02* (2013.01); *H04L 51/52* (2022.05); *H04L 63/0823* (2013.01); *H04L 67/306* (2013.01); *G06F 40/30* (2020.01); *G06N 20/00* (2019.01)

(58) Field of Classification Search

None

See application file for complete search history.

(56) References Cited

U.S. PATENT DOCUMENTS 6,144,938 A * 11/2000 Surace ................ H04M 3/4936 704/E13.004
6,622,140 B1 * 9/2003 Kantrowitz ........... G06F 40/295 707/999.005
7,266,499 B2 * 9/2007 Surace .................. G10L 13/033 704/E15.021
7,603,413 B1 * 10/2009 Herold ................ H04L 12/1813 709/204
10,339,931 B2 * 7/2019 Tseretopoulos ....... G10L 15/183
10,446,142 B2 * 10/2019 Lim .................... G10L 15/1822
10,645,225 B1 * 5/2020 Stoops .................... H04L 51/10
11,165,725 B1 * 11/2021 Silverstein .............. H04L 51/04
11,188,809 B2 * 11/2021 Herzig ..................... G06N 5/04

(Continued)

OTHER PUBLICATIONS

Menon, Vishnu M., and H. A. Rahulnath. "A novel approach to evaluate and rank candidates in a recruitment process by estimating emotional intelligence through social media data." 2016 International Conference on Next Generation Intelligent Systems (ICNGIS). IEEE, 2016. (Year: 2016).*

(Continued)

*Primary Examiner* — Maria S Ayad

(74) *Attorney, Agent, or Firm* — Michael A. Springs, Esq.; Shumaker, Loop & Kendrick, LLP; Patrick B. Horne

(57) ABSTRACT

A system and method are described for personalizing a chat bot for a user. The system and method include receiving user authentication, retrieving a user profile, determining a user personality using an AI engine configured to predict the user's personality, receiving indication for a chat bot response, determining content and personality of the chat bot response based on the user profile, sending the chat bot response, receiving a user reply, determining user sentiment from the user reply, and recording user sentiment, response, and reply in the user profile. The system and method may further include providing the user with a predetermined personality for the chat bot.

13 Claims, 9 Drawing Sheets

(56) References Cited

U.S. PATENT DOCUMENTS 11,238,100 B2 * 2/2022 Vasconcelos ....... G10L 15/1822
11,501,004 B2 * 11/2022 Coffing ................... H04L 51/58
11,570,180 B1 * 1/2023 Fitzpatrick ............ H04L 9/0643
11,663,182 B2 * 5/2023 Emma .................... G06N 5/041 706/55
11,856,141 B2 * 12/2023 Klemm ............... H04M 3/5166
12,050,574 B2 * 7/2024 Emma .................... G06N 20/00
2002/0147766 A1 * 10/2002 Vanska ................... H04L 63/12 709/205
2002/0174073 A1 * 11/2002 Nordman ............. G06Q 20/382 705/64
2009/0070673 A1 * 3/2009 Barkan ............ H04N 21/25891 715/716
2010/0185946 A1 * 7/2010 Seacat Deluca ........ G06F 9/451 715/702
2015/0371663 A1 * 12/2015 Gustafson ............... G10L 25/51 704/270.1
2016/0300570 A1 * 10/2016 Gustafson ............... G10L 25/51
2017/0230312 A1 * 8/2017 Barrett .................... G06F 40/35
2017/0324867 A1 * 11/2017 Tamblyn ............. H04L 65/1093
2018/0090137 A1 * 3/2018 Horling ............... G06F 16/9535
2018/0336048 A1 * 11/2018 Zarlengo ................. G06F 9/453
2019/0058793 A1 * 2/2019 Konig ..................... G06F 40/30
2019/0198150 A1 * 6/2019 Kang ..................... G16H 20/30
2019/0205382 A1 * 7/2019 Raux ....................... G06F 40/30
2019/0304036 A1 * 10/2019 Nassar ................... G06Q 10/40
2020/0036659 A1 * 1/2020 Wu ......................... G06F 40/30
2020/0194002 A1 * 6/2020 Karpukhin .............. G10L 15/22
2020/0302263 A1 * 9/2020 Douek ................... G06N 20/00
2022/0067296 A1 * 3/2022 Singh Bawa ............ G06N 3/08
2022/0179888 A1 * 6/2022 Wang .................... G06F 16/338
2023/0135179 A1 * 5/2023 Mielke ................... G06N 5/022 704/232
2024/0111399 A1 * 4/2024 Chung .................... G06F 40/14
2025/0227078 A1 * 7/2025 Dong ...................... G06F 40/35

OTHER PUBLICATIONS

Wald, Randall, Taghi Khoshgoftaar, and Chris Sumner. “Machine prediction of personality from Facebook profiles.” 2012 IEEE 13th International Conference on Information Reuse & Integration (IRI). IEEE, 2012 (Year: 2012).*

* cited by examiner

SYSTEM AND METHOD FOR PERSONALIZATION OF A CHAT BOT

FIELD OF THE INVENTION

This invention is related generally to the field of automated chat bots, and more particularly embodiments of the invention relate to personalizing a chat bot for a particular user's preference.

BACKGROUND OF THE INVENTION

Chat bots are conversational computer programs configured to communicate with a user, usually using textual language but can also include verbal language as well. Chat bots can be useful in systems for users to obtain help or information. Chat bots are typically trained to be able to answer simple questions and guide users through a task. Generally, chat bots are dry and have little to no personality. This can often lead to users not engaging with a system chat bot and preferring to converse with a human agent.

BRIEF SUMMARY

Shortcomings of the prior art are overcome and additional advantages are provided through the provision of a computing system for personalizing a chat bot to a particular user's preferences.

Embodiments of the invention include a system for personalizing a chat bot; the system includes at least one processor, a communication interface communicatively coupled to the at least one processor, and a memory device storing executable code. The executable code, when executed causes the at least one processor to: receive user authentication, retrieve a user profile based on the user authentication, and determine user personality based on the user profile. The executable code further causes the at least one processor to receive an indication for a chat bot response, determine the chat bot response which contains content and personality based on the user profile, send the determined chat bot response to the user, receive a user reply in response to the chat bot response, determine user sentiment based on the user reply, and record the user sentiment, chat bot response, and user reply in the user profile.

In some embodiments, the executable code further causes the at least one processor to provide a chat bot personality selection to the user, receive from the user a selected chat bot personality, and record in the user profile the selected chat bot personality. In some embodiments, the chat bot personality selected comprises pre-determined chat bot personalities.

According to embodiments of the invention, a method for personalizing a chat bot is disclosed. The method includes: receiving user authentication, retrieving a user profile, determining a user personality, receiving an indication for a chat bot response, determining the chat bot response containing content and personality based on the user profile, sending the determined chat bot response to the user, receiving a user reply in response to the chat bot response, determining a user sentiment based on the user reply, recording the user sentiment in the user profile, and recording the chat bot response and the user reply in the user profile.

In some embodiments, the method further includes providing to the user a chat bot personality selection, receiving from the user the user's selected chat bot personality, and recording in the user profile the user's selected chat bot personality. In some embodiments, the chat bot personality selection comprises pre-determined chat bot personalities.

In some embodiments, determining user sentiment comprises the use of natural language processing.

In some embodiments, the user profile contains a user sentiment log, the user personality, user preferences, and user chat history. Additionally, or alternatively, the user profile contains user social media data and user location data. In some embodiments the user profile contains user transactional data.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION OF THE SEVERAL VIEWS OF THE DRAWINGS

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

DETAILED DESCRIPTION

Figure 1:
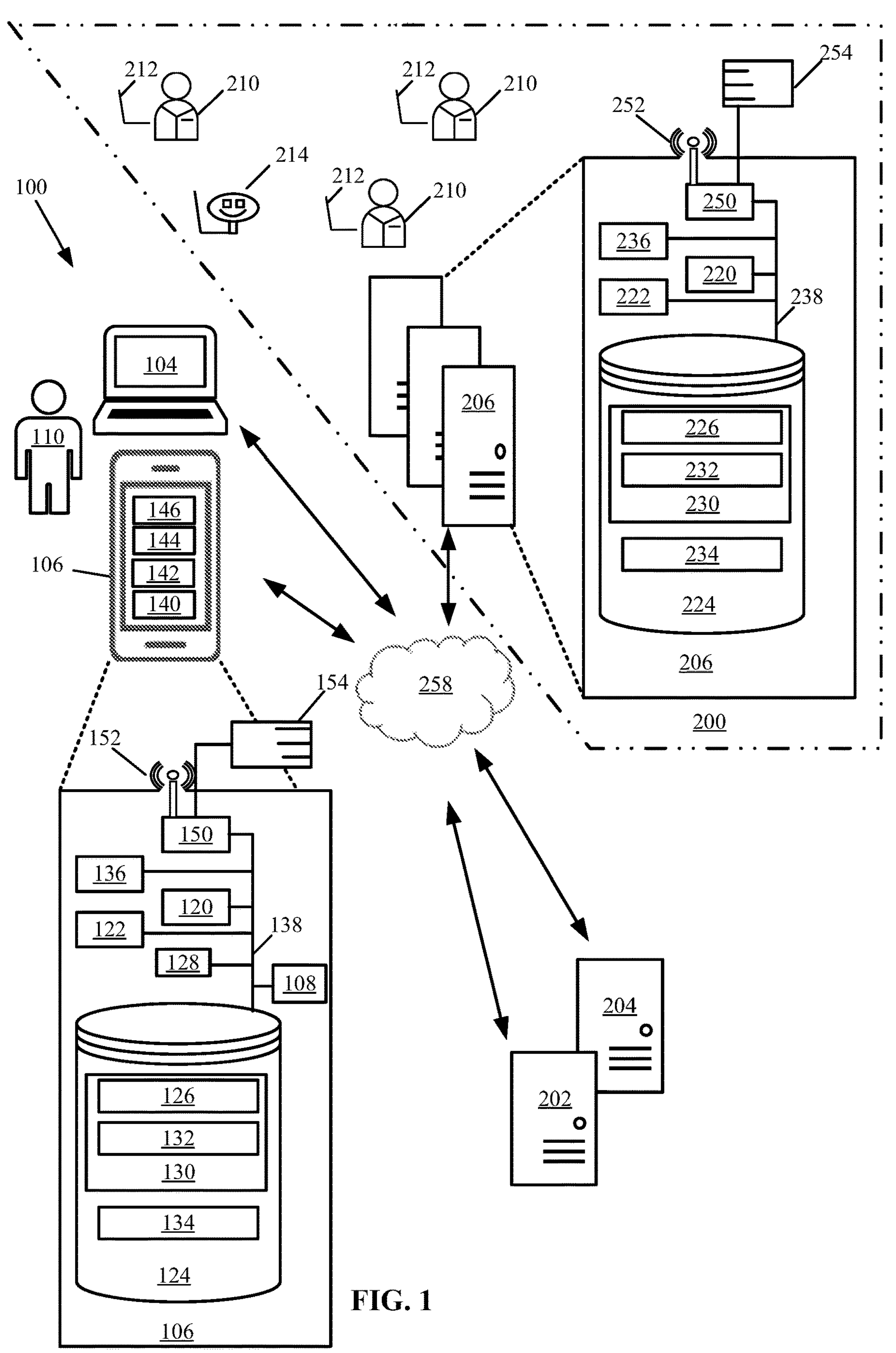
FIG. 1 illustrates an enterprise system, and environment thereof for personalizing a chat bot, in accordance with an embodiment of the present invention.

Aspects of the present invention and certain features, advantages, and details thereof are explained more fully below with reference to the non-limiting examples illustrated in the accompanying drawings. Descriptions of well-known processing techniques, systems, components, etc. are omitted so as to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

Unless described or implied as exclusive alternatives, features throughout the drawings and descriptions should be taken as cumulative, such that features expressly associated with some particular embodiments can be combined with other embodiments.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code, as referred to in this application, can include both software and hardware. For example, program code in certain embodiments of the present invention can include fixed function hardware, while other embodiments can utilize a software-based implementation of the functionality described. Certain embodiments combine both types of program code.

FIG. 1 illustrates a system 100 and environment thereof, according to at least one embodiment, by which a user 110 benefits through use of services and products of an enterprise system 200. The environment may include, for example, a distributed cloud computing environment (private cloud, public cloud, community cloud, and/or hybrid cloud), an on-premise environment, fog computing environment, and/or an edge computing environment. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Further non-limiting examples of input devices and/or output devices include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning system device (GPS) configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to use various analytical tools (e.g., algorithmic applications) to leverage data to make predictions or decisions. Machine learning programs may be configured to implement various algorithmic processes and learning approaches including, for example, decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

Machine learning models are trained using various data inputs and techniques. Example training methods may include, for example, supervised learning, (e.g., decision tree learning, support vector machines, similarity and metric learning, etc.), unsupervised learning, (e.g., association rule learning, clustering, etc.), reinforcement learning, semi-supervised learning, self-supervised learning, multi-instance learning, inductive learning, deductive inference, transductive learning, sparse dictionary learning and the like. Example clustering algorithms used in unsupervised learning may include, for example, k-means clustering, density based special clustering of applications with noise (DB SCAN), mean shift clustering, expectation maximization (EM) clustering using Gaussian mixture models (GMM), agglomerative hierarchical clustering, or the like. According to one embodiment, clustering of data may be performed using a cluster model to group data points based on certain similarities using unlabeled data. Example cluster models may include, for example, connectivity models, centroid models, distribution models, density models, group models, graph based models, neural models and the like.

One subfield of machine learning includes neural networks, which take inspiration from biological neural networks. In machine learning, a neural network includes interconnected units that process information by responding to external inputs to find connections and derive meaning from undefined data. A neural network can, in a sense, learn to perform tasks by interpreting numerical patterns that take the shape of vectors and by categorizing data based on similarities, without being programmed with any task-specific rules. A neural network generally includes connected units, neurons, or nodes (e.g., connected by synapses) and may allow for the machine learning program to improve performance. A neural network may define a network of functions, which have a graphical relationship. Various neural networks that implement machine learning exist including, for example, feedforward artificial neural networks, perceptron and multilayer perceptron neural networks, radial basis function artificial neural networks, recurrent artificial neural networks, modular neural networks, long short term memory networks, as well as various other neural networks.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An artificial neural network (ANN), also known as a feedforward network, may be utilized, e.g., an acyclic graph with nodes arranged in layers. A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

Figures 2A, 2B, 2C:
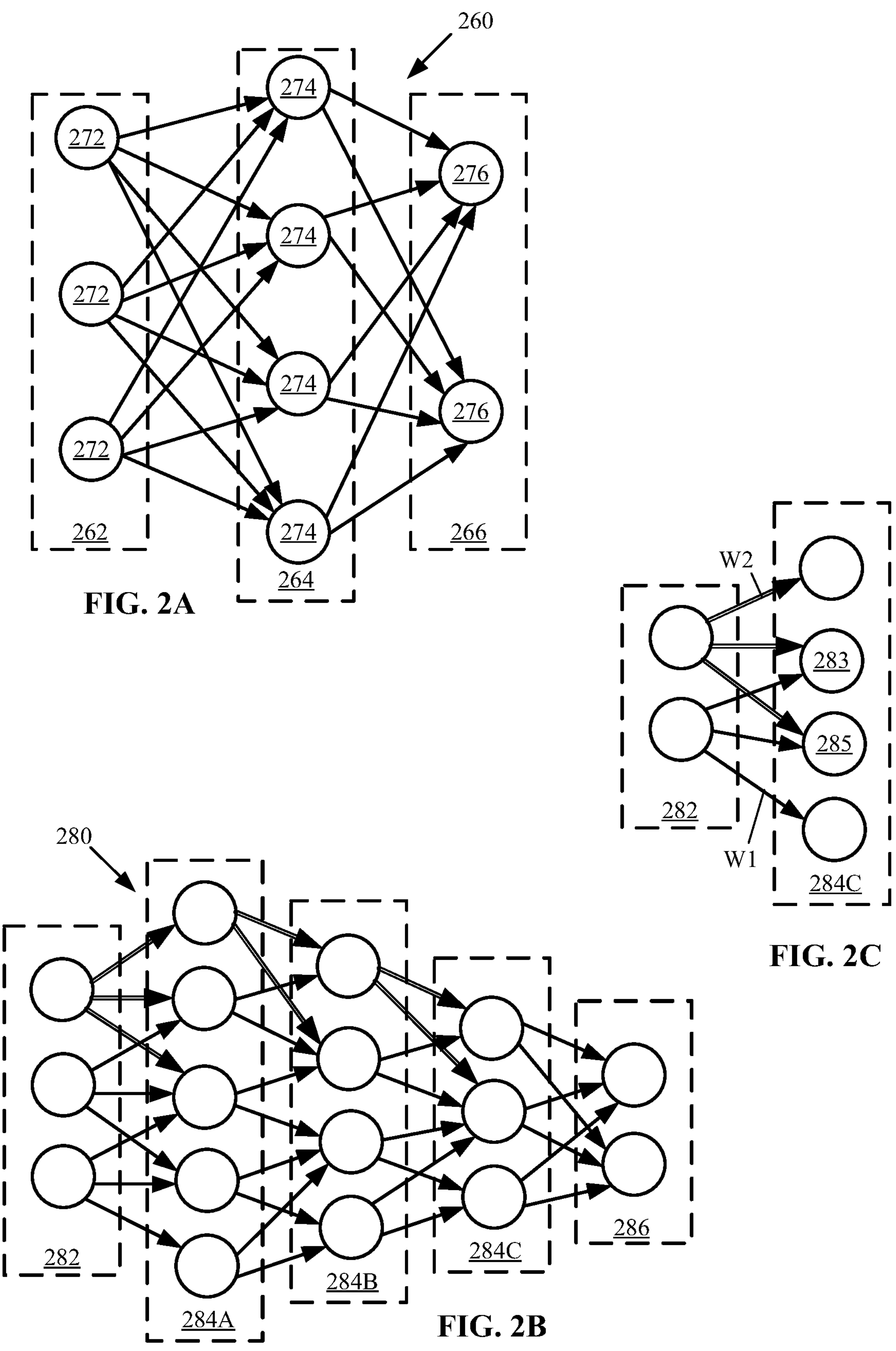
FIG. 2A is a diagram of a feedforward network, according to at least one embodiment, utilized in machine learning.
FIG. 2B is a diagram of a convolution neural network, according to at least one embodiment, utilized in machine learning.
FIG. 2C is a diagram of a portion of the convolution neural network of FIG. 2B, according to at least one embodiment, illustrating assigned weights at connections or neurons.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
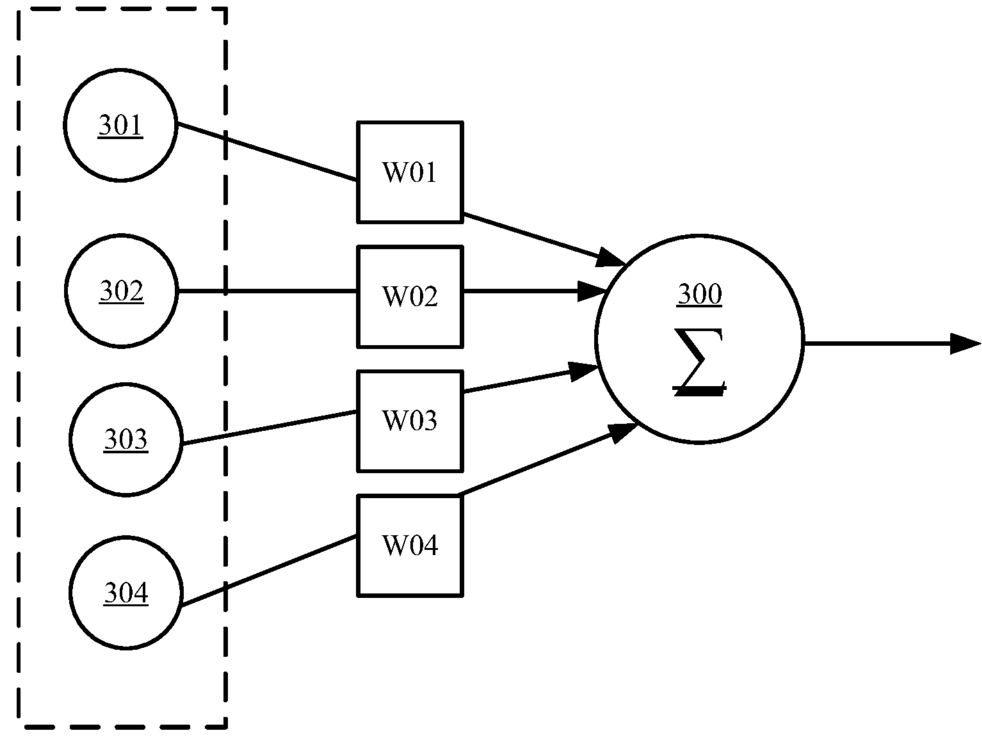
FIG. 3 is a diagram representing an exemplary weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

Figure 4:
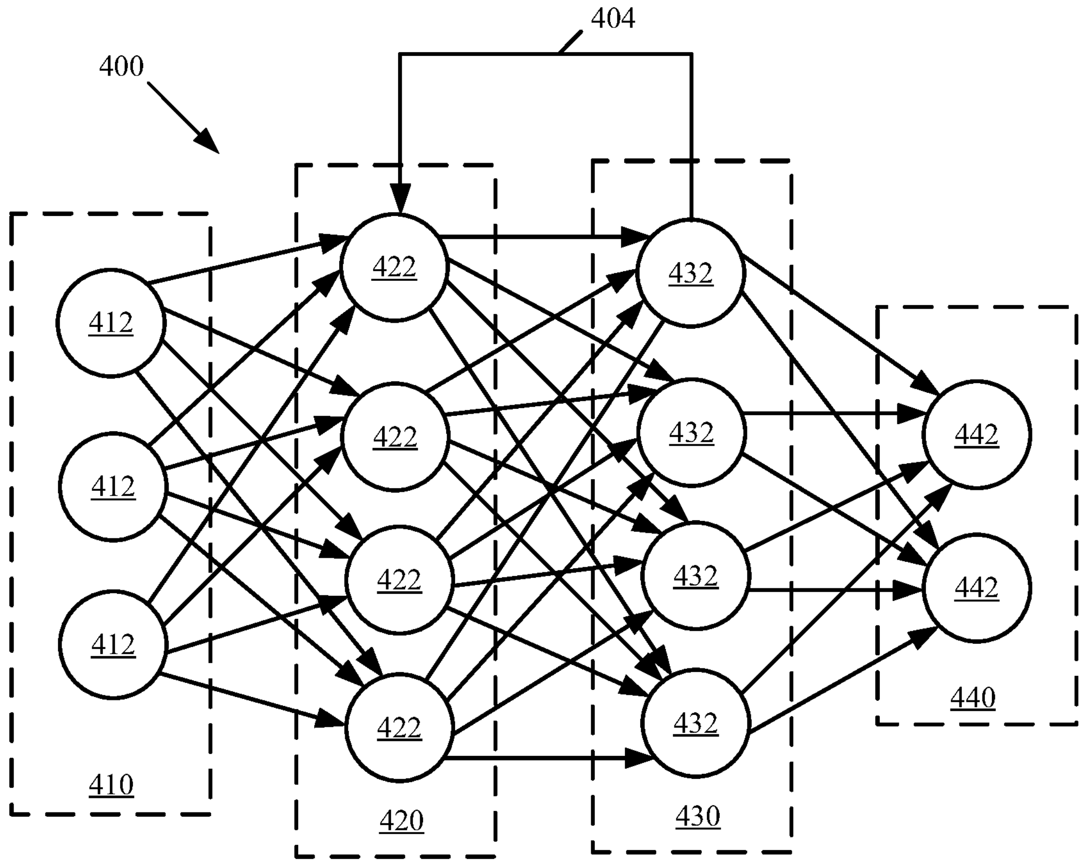
FIG. 4 is a diagram of a Recurrent Neural Network RNN, according to at least one embodiment, utilized in machine learning.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine-learning program may include one or more support vector machines. A support vector machine may be configured to determine a category to which input data belongs. For example, the machine-learning program may be configured to define a margin using a combination of two or more of the input variables and/or data points as support vectors to maximize the determined margin. Such a margin may generally correspond to a distance between the closest vectors that are classified differently. The machine-learning program may be configured to utilize a plurality of support vector machines to perform a single classification. For example, the machine-learning program may determine the category to which input data belongs using a first support vector determined from first and second data points/variables, and the machine-learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine-learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine-learning program may include a relatively large number of layers, e.g., three or more layers, and may be referred to as deep neural networks. For example, the node of each hidden layer of a neural network may be associated with an activation function utilized by the machine-learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input/output transformations and may include, according to various embodiments, a backpropagation algorithm. According to various embodiments, deep neural networks may be configured to classify images of handwritten digits from a dataset or various other images. According to various embodiments, the datasets may include a collection of files that are unstructured and lack predefined data model schema or organization. Unlike structured data, which is usually stored in a relational database (RDBMS) and can be mapped into designated fields, unstructured data comes in many formats that can be challenging to process and analyze. Examples of unstructured data may include, according to non-limiting examples, dates, numbers, facts, emails, text files, scientific data, satellite imagery, media files, social media data, text messages, mobile communication data, and the like.

Figure 5:
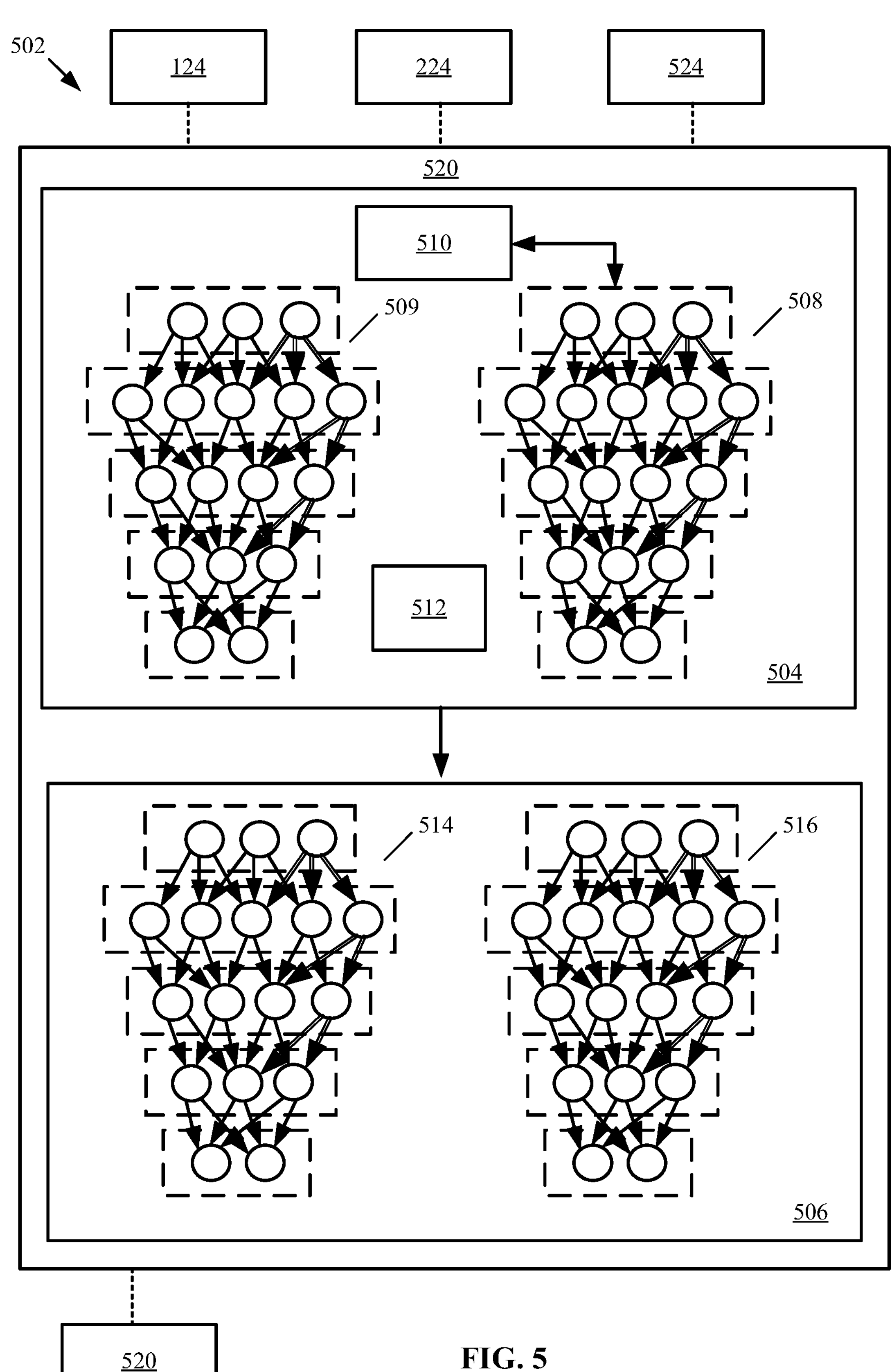
FIG. 5 is a schematic logic diagram of an artificial intelligence program including a front-end and a back-end algorithm.

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., storage device 124, memory device 122, storage device 224, and/or memory device 222) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation such as natural language processing). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine-learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine-learning program may include variations, adaptations, and alternatives suitable to perform the operations necessary for the system, and the present disclosure is equally applicable to such suitably configured machine learning and/or artificial intelligence programs, modules, etc. For instance, the machine-learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine-learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

Figure 6:
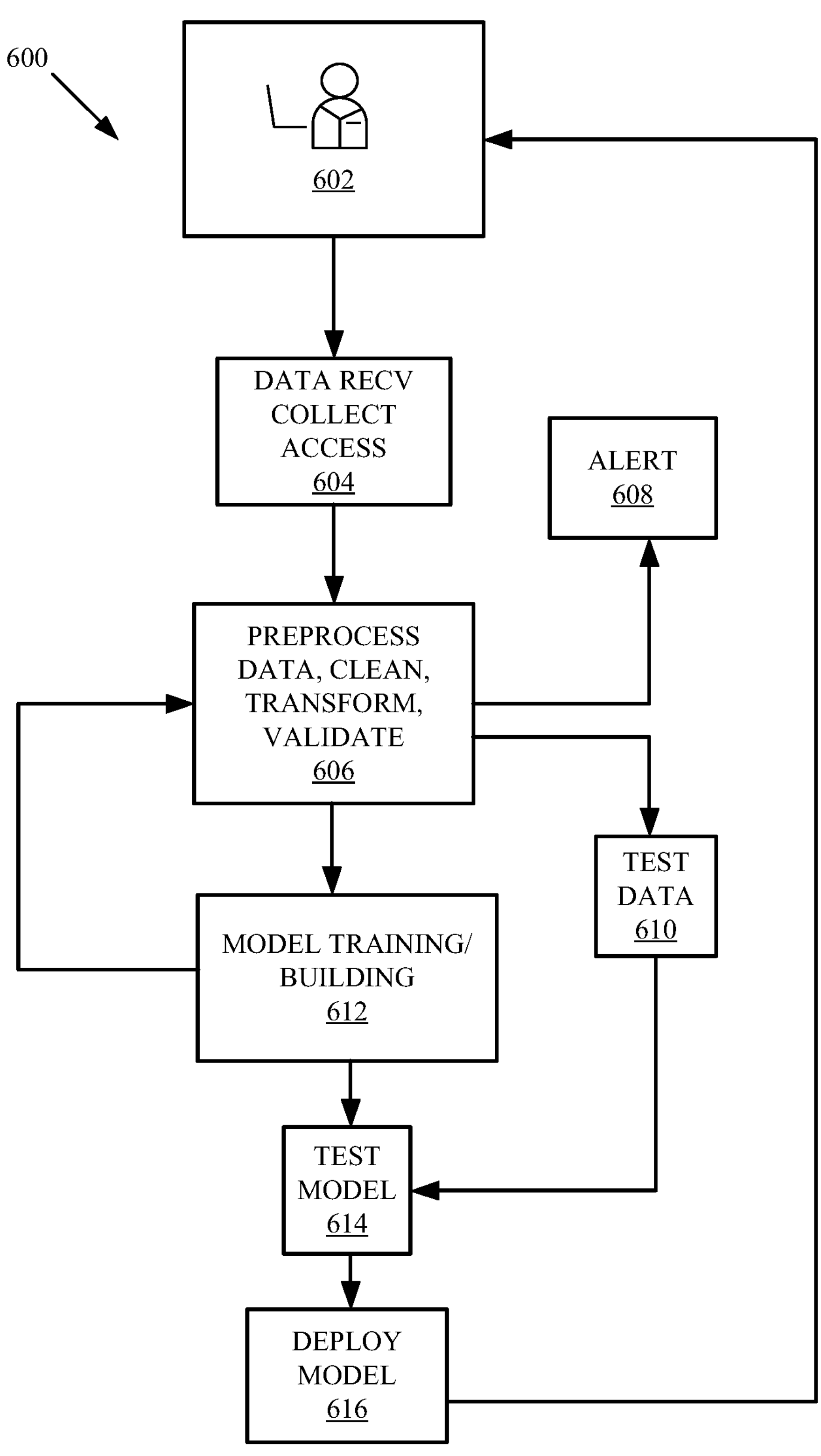
FIG. 6 is a flow chart representing a method, according to at least one embodiment, of model development and deployment by machine learning.

FIG. 6 is a flow chart representing a method 600, according to at least one embodiment, of model development and deployment by machine learning. The method 600 represents at least one example of a machine learning workflow in which steps are implemented in a machine-learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606, the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

The systems and methods described herein are configured to improve the conversability and likability of a chat bot by personalizing the chat bot for a particular user. The systems and methods described herein take into consideration the user's preferences, the user's personality, the user's determined sentiment or disposition towards chat bot responses, and the user's profile information to determine the content and personality of a chat bot response to the user.

Figure 7:
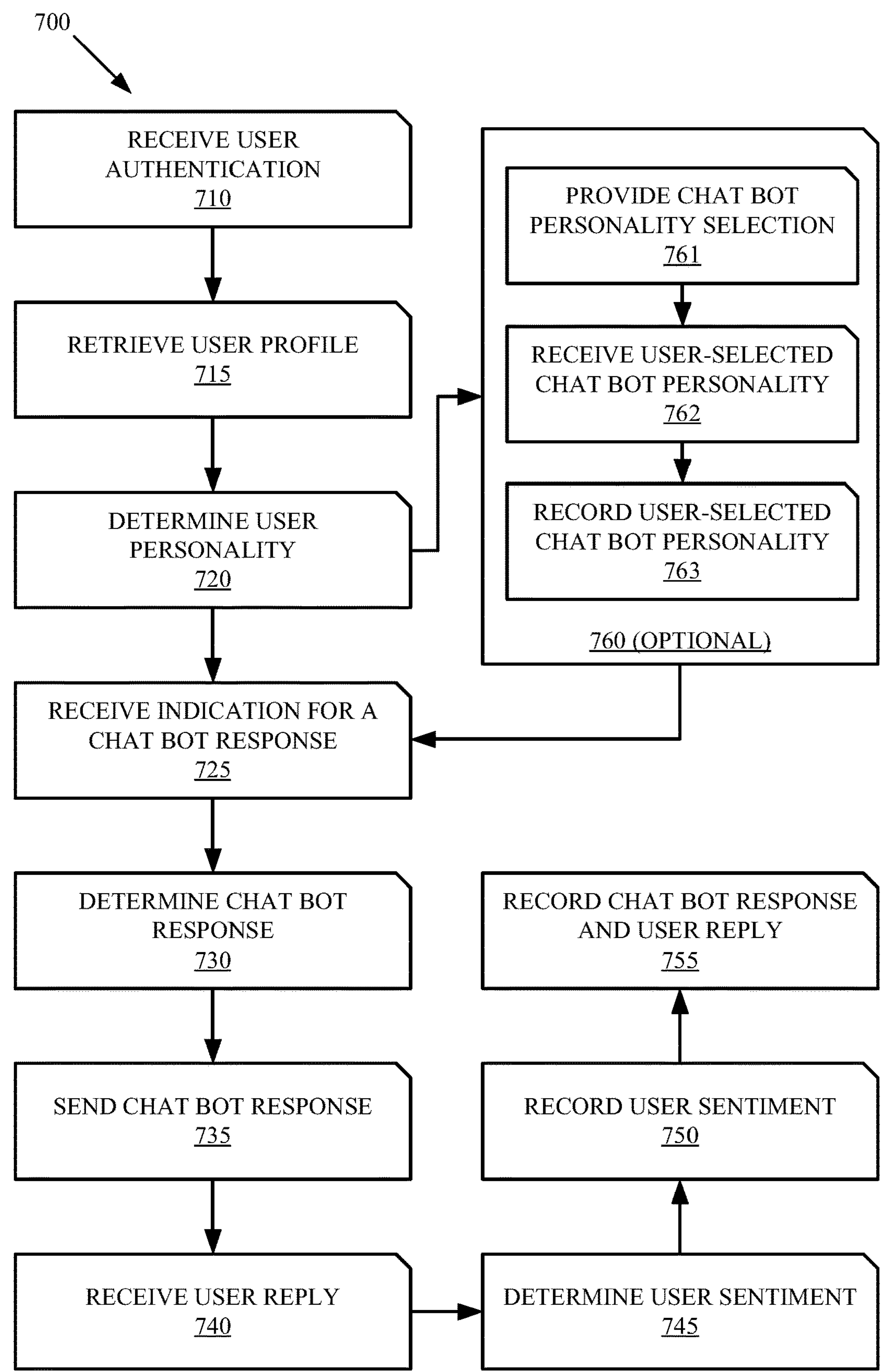
FIG. 7 is a flow chart illustrating the method of personalizing a chat bot, in accordance with an embodiment of the present invention.

The system, as described previously, comprises at least one processor, a communication interface, and a memory device. The communication interface is communicatively coupled to the at least one processor. The memory device stores executable code that when executed causes the processor to perform the steps in the method described herein. The method is illustrated in the flow chart in FIG. 7.

Figure 8:
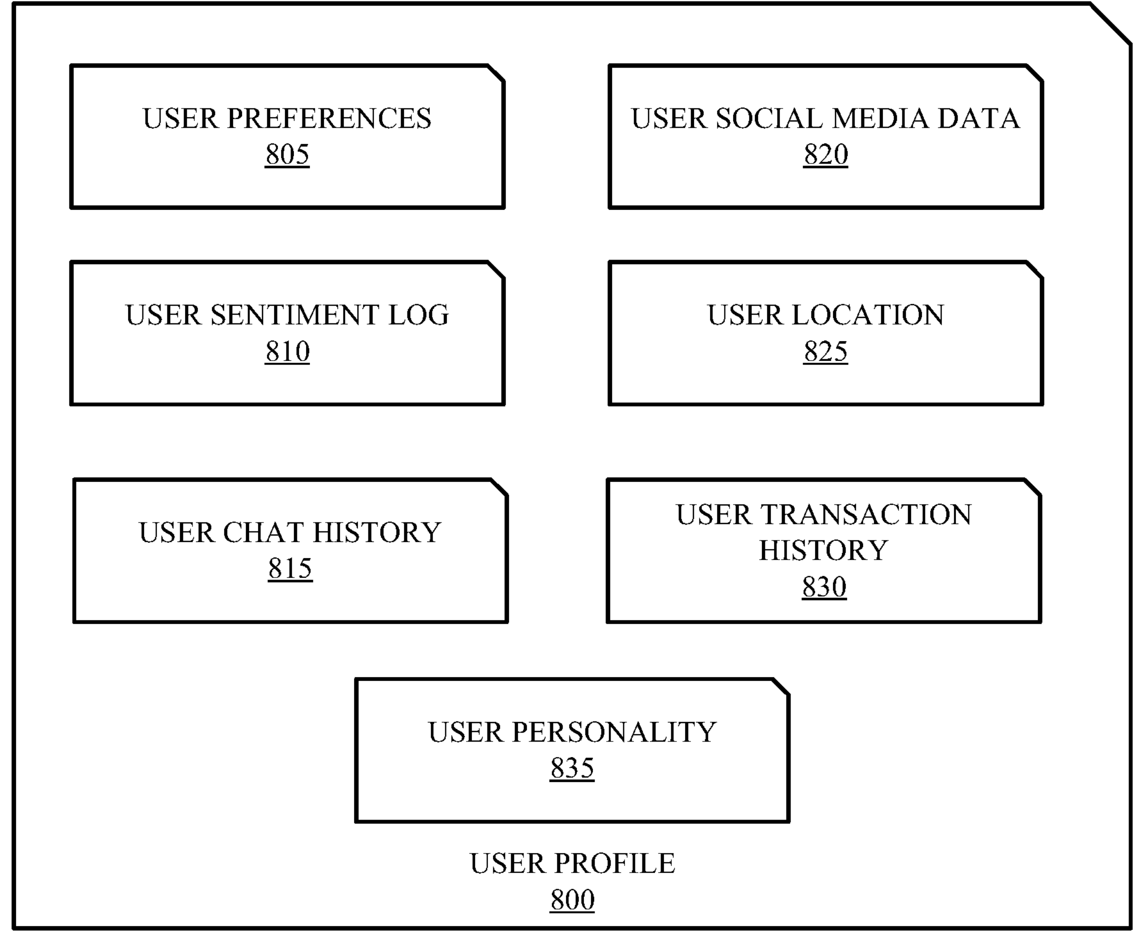
FIG. 8 is a diagram of a user profile for personalizing a chat bot, in accordance with an embodiment of the present invention.

At step 710, the system receives user authentication. User authentication may be in the form of a username and password. Additionally, or alternatively, user authentication may be in the form of a biometric authentication. In some embodiments, the user authentication may be in the form of a one-time-passcode. Following authentication, the system proceeds to step 715 to retrieve the user's profile. The user profile 800, as illustrated in FIG. 8 may contain one or more of user preferences 805, a user sentiment log 810, a user chat history 815, user social media data 820, user location 825, user transaction history 830, and user personality.

The information in the user profile 800 is used to determine the user's personality at step 720. The user's personality is determined using an AI engine. The AI engine used to determine the user's personality may include a neural network, as described above in the detailed description of the present disclosure. Additionally, or alternatively, the AI engine used to determine the user's personality may be a concurrent neural network (CNN). In some embodiments, the AI engine used to determine the user's personality may be a recurrent neural network (RNN). Additionally, or alternatively, the AI engine used to determine the user's personality may be a feed-forward network. The AI engine used to determine the user's personality may, in some embodiments, include a Bayesian machine learning algorithm. In some embodiments, the Bayesian machine learning algorithm is a Naive Bayes algorithm. The user personality may then be then recorded in the user profile.

The AI engine used to determine the user's personality may be trained and deployed via the method illustrated in FIG. 6. The training test data may be user data stored in the user profile, such as user preferences, user sentiment log, user chat history, user social media data, user location, and user transaction history.

Figure 9:
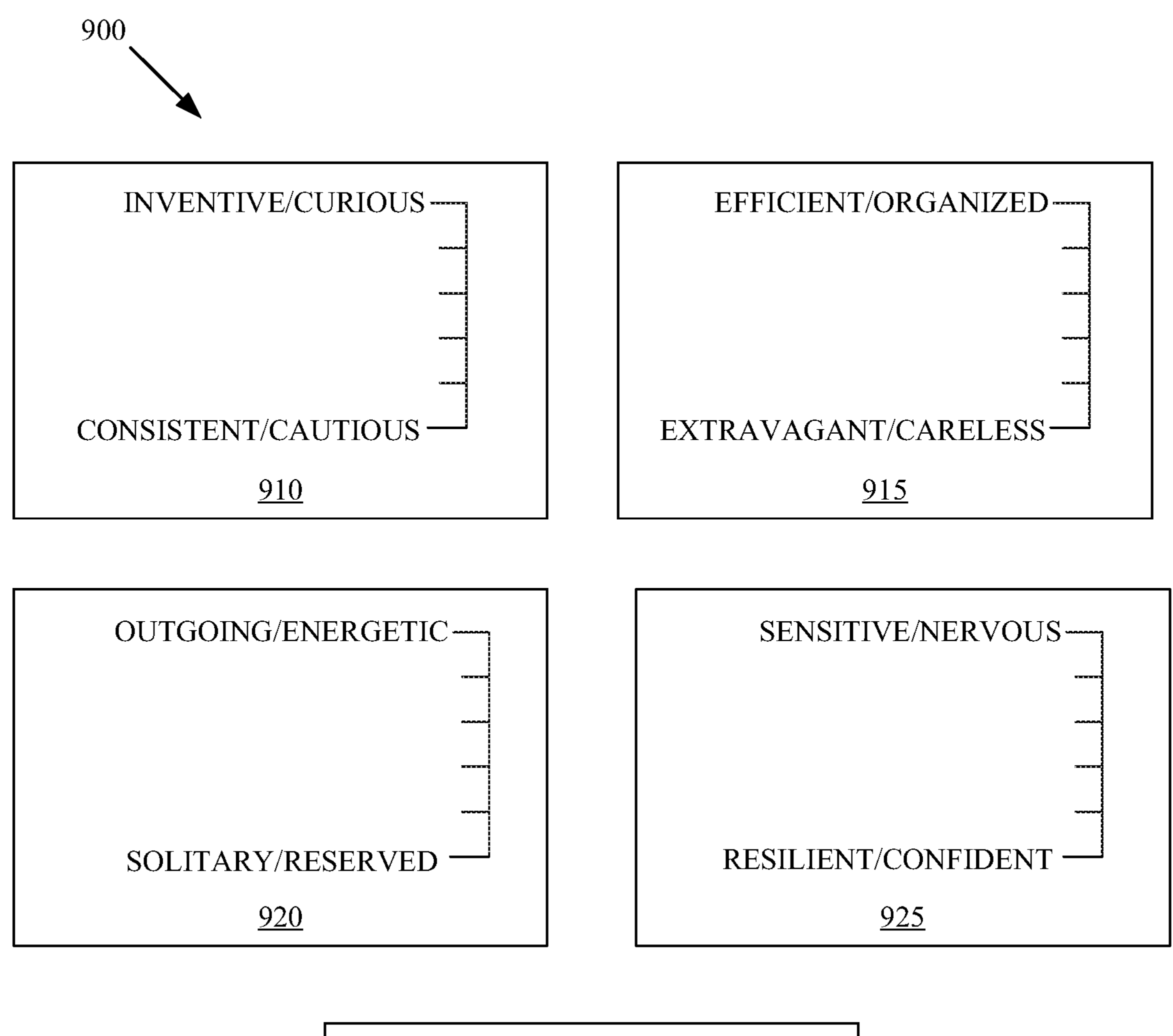
FIG. 9 is a diagram illustrating a personality profile, in accordance with an embodiment of the present invention.

The AI engine is trained to determine the user's personality by measuring the user's personality traits. In some embodiments, as shown in FIG. 9, the personality traits 900 include: openness 910, conscientiousness 915, extroversion 920, agreeableness 930, and neuroticism 925. Each trait, for the user, is ranked on a scale. For openness 910, the scale ranges from inventive/curious to consistent/cautious. For conscientiousness 915, the scale ranges from efficient/organized to extravagant/careless. For extroversion 920, the scale ranges from outgoing/energetic to solitary/reserved. For agreeableness 930, the scale ranges from friendly/compassionate to critical/rational. For neuroticism 925 the scale ranges from sensitive/nervous to resilient/confident. The user's place on each scale can be predicted using the AI engine.

At step 725, the system will receive an indication for a chat bot response. This is an indication that the chat bot should communicate with the user. The indication may be a first communication from the user, or the indication may be a log-on instance from the user indicating that the chat bot should initiate communication. At this point, the system will proceed to step 730 to determine the chat bot response. The chat bot response will contain content, the substance of the chat, as well as personality. Both content and personality will be determined based on the user profile. The content will be determined based on the stored data in the user profile. For example, if the user typically asks the chat bot "how's the weather" the chat bot may initiate the communication by telling the user how the weather is. In another example, the user may ask the chat bot a question about the user's transaction history, the transaction history may be part of the user profile and the chat bot can retrieve content from the user's transaction history to respond to the user. The personality of the chat bot will also be determined from the user profile. In an example, the user profile will store the user's determined personality and will respond with a personality complimentary to the user's determined personality. For example, if the user is ranked on the sensitive/nervous side of neuroticism, the chat bot may have a personality that attempts to calm the user's nervousness and/or is cognizant of the user's sensitivities. The chat bot response is sent to the user at step 735, and at step 740 the system receives a user reply in response to the chat bot response. From the user reply, the system will determine the user's sentiment at step 745.

The systems and methods described herein may use natural language processing to determine the user's sentiment. User sentiment, as used herein, is intended to encompass the user's opinion (negative, positive, neutral), attitude, or emotion (happy, sad, angry, neutral, disgust, fear, excitement, etc) towards a response, topic, entity, subject, etc. Sentiment analysis uses natural language processing to find and extract information from the text, or language, in the user's reply. In some embodiments, the sentiment analysis assigns a sentiment score to a list of topics. These sentiment scores are recorded in the user's profile to keep track of the user's sentiment towards a variety of topics. Sentiment analysis may utilize machine learning, such as a deep learning algorithm.

At step 750, the system will record the user sentiment in the user profile. At step 755, the system records both the chat bot response and the user reply in the user profile. The recorded user sentiment may be used to determine future chat bot responses. For example, if the user sentiment was negative towards a chat bot response, a similar response may not be sent the next time the user has a similar request from the chat bot. Alternatively, if the user's sentiment was positive, it may serve to increase similar chat bot responses in the future.

In some embodiments, the user may have the optional ability to choose a pre-determined personality for the chat bot at step 760. This embodiment includes step 761 providing a chat bot personality selection to the user. The user may be able to choose from pre-loaded and predetermined personalities for the chat bot. For example, the user may want a chat bot with a feisty personality. In another example, the user may want a chat bot with a subservient personality. Once the user selects a chat bot personality, the system will record the user-selected chat bot personality in the user preferences of the user profile. This user-selected personality will be used when determining the personality of the chat bot response at step 730. In the absence of any user-selected chat bot personality, the system will take the user's determined personality into consideration when determining the chat bot response at step 730. In some embodiments, predetermined chat bot personalities may include: subservient, rude, gleeful, etc, Additionally, or alternatively, the predetermined chat bot personalities may align with Myers Briggs personality types including; ENTJ, INTJ, ENTP, INTP, ENFJ, INFJ, ENFP, INFP, ESTJ, ISTJ, ESFJ, ISFJ, ESTP, ISTP, ESFP, AND ISFP. In other embodiments, the predetermined chat bot personalities may align with different locations on the scales illustrated in FIG. 9.

Aspects of the present invention are described herein with reference to flowchart illustrations and/or block diagrams of computer-implemented methods and computing systems according to embodiments of the invention. It will be understood that each block of the flowchart illustrations and/or block diagrams, and combinations of blocks in the flowchart illustrations and/or block diagrams, can be implemented by computer readable program instructions that may be provided to a processor of a general purpose computer, special purpose computer, or other programmable data processing apparatus (the term "apparatus" includes systems and computer program products). The processor may execute the computer readable program instructions thereby creating a means for implementing the actions specified in the flowchart illustrations and/or block diagrams. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the actions specified in the flowchart illustrations and/or block diagrams. In particular, the computer readable program instructions may be used to produce a computer-implemented method by executing the instructions to implement the actions specified in the flowchart illustrations and/or block diagrams.

The computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

In the flowchart illustrations and/or block diagrams disclosed herein, each block in the flowchart/diagrams may represent a module, segment, or portion of instructions, which comprises one or more executable instructions for implementing the specified logical function(s). In some implementations, the functions noted in the blocks may occur out of the order noted in the Figures. For example, two blocks shown in succession may, in fact, be executed substantially concurrently, or the blocks may sometimes be executed in the reverse order, depending upon the functionality involved.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A system utilizing a machine learning framework for personalizing a chat bot for improved user experience, the system comprising:

at least one processor;

a communication interface communicatively coupled to the at least one processor; and a memory device storing executable code that, when executed, causes the at least one processor to:

train an algorithm, via a machine learning framework and using a set of training data, the algorithm configured to determine user personality, the algorithm comprising:

a front-end convolutional neural network configured for language processing to perform pre-processing and feature recognition on data selected from users' sentiment logs, users' preferences, users' chat history logs, users' social media data, users' locations, and users' transactional data, the front-end convolution neural network outputting extracted feature vectors; and a back-end dense neural network configured to receive the extracted feature vectors from the front-end convolution neural network and output a user personality vector comprising numerical rankings of openness, conscientiousness, extroversion, agreeableness, and neuroticism, the back-end dense neural network comprising nodes wherein each node of a previous layer is connected to an associated node of a subsequent layer, and wherein each node of each hidden layer of the back-end dense neural network is associated with an activation function to generate an output received by a corresponding node in a subsequent layer; and the training further comprising:

performing data ingestion and the pre-processing by cleaning and transforming the set of training data, and versioning the set of training data to connect a data snapshot with a resulting trained model;

performing real-time data validation during each training iteration that confirms numerical ranges and category distributions, and upon detection of an anomaly in the set of training data, automatically pauses training without human intervention and issues an alert to an agent;

iteratively predicting the user personality vector based on the set of training data;

testing and comparing the user personality vector predicted during each iteration against a target variable vector and determining an associated error amount for each output data point by comparing the predicted user personality vector against the target variable vector, the associated error amount communicated back through the algorithm as an error signal; and modifying, via a feedback loop, respective weights assigned to each of the nodes associated with each of the set of training data to improve predictability of the ranking of the user personality and terminating the training when the associated error amount for the output data is less than a predetermined acceptable level;

receive a user authentication;

retrieve a user profile based on the user authentication;

determine a user personality by executing the trained algorithm to generate a user personality vector based on data within the user profile, wherein the user profile comprises: a user sentiment log, user preferences, user chat history, user social media data, user location, and user transactional data;

record the user personality vector in the user profile;

receive a first indication for a first chat bot response, wherein the first indication is the user authentication;

determine the first chat bot response, wherein the first chat bot response comprises first content that is based on the user profile and a chat bot personality that is based on the user personality vector in the user profile;

send the first chat bot response to the user;

receive a first user reply in response to the first chat bot response;

determine a first user sentiment based on the first user reply by executing a recurrent neural network configured for language processing to detect multiple topics within the first user reply and to assign, for each of multiple topics detected in the first user reply, a respective sentiment score wherein the respective sentiment score comprises at least one of an opinion classification of negative, positive, or neutral, and an emotion classification;

record, in the users' sentiment log of the user profile, entries comprising a topic identifier, the sentiment score, and a timestamp;

record the first chat bot response, the first user reply, and the timestamp in the users' chat history log of the user profile; and determine a second chat bot response based at least in part on the recorded sentiment score, wherein responsive to the sentiment score for a topic being negative, the second chat bot response avoids content similar to the first chat bot response for the topic, and responsive to the sentiment score for the topic being positive, the second chat bot response increases content similar to the first chat bot response for the topic.

2. The system according to claim 1, wherein the training is performed using versioned data snapshots linked to corresponding trained models such that ingestion of new data or an update to the pre-processing triggers generation of an updated model tied to the new data version.

3. The system according to claim 1, wherein the machine-learning framework implements primitives comprising at least tensor convolutions, pooling operations, activation functions, matrix operations, and vector operations.

4. The system according to claim 1, wherein the recurrent neural network comprises a feedback connector configured to communicate parameter data from at least one node of a subsequent hidden layer to at least one node of a previous hidden layer.

5. A method utilizing a machine learning framework for personalizing a chat bot for improved user experience, the method comprising:

training an algorithm, via a machine learning framework and using a set of training data, the algorithm configured to determine user personality, the algorithm comprising:

a front-end convolutional neural network configured for language processing to perform pre-processing and feature recognition on data selected from users' sentiment logs, users' preferences, users' chat history logs, users' social media data, users' locations, and users' transactional data, the front-end convolution neural network outputting extracted feature vectors; and a back-end dense neural network configured to receive the extracted feature vectors from the front-end convolution neural network and output a user personality vector comprising numerical rankings of openness, conscientiousness, extroversion, agreeableness, and neuroticism, the back-end dense neural network comprising nodes wherein each node of a previous layer is connected to an associated node of a subsequent layer, and wherein each node of each hidden layer of the back-end dense neural network is associated with an activation function to generate an output received by a corresponding node in a subsequent layer; and the training further comprising:

performing data ingestion and the pre-processing by cleaning and transforming the set of training data, and versioning the set of training data to connect a data snapshot with a resulting trained model;

performing real-time data validation during each training iteration that confirms numerical ranges and category distributions, and upon detection of an anomaly in the set of training data automatically pausing training without human intervention and issuing an alert to an agent;

iteratively predicting the user personality vector based on the set of training data;

testing and comparing the user personality vector predicted during each iteration against a target variable vector and determining an associated error amount for each output data point by comparing the predicted user personality vector against the target variable vector, the associated error amount communicated back through the algorithm as an error signal; and modifying, via a feedback loop, respective weights assigned to each of the nodes associated with each of the set training data to improve predictability of the ranking of the user personality, and terminating the training when the associated error amount for the output data is less than a predetermined acceptable level;

receiving a user authentication;

retrieving a user profile based on the user authentication;

determining a user personality by executing the trained algorithm to generate a user personality vector based on data within the user profile, wherein the user profile comprises: a user sentiment log, user preferences, user chat history, user social media data, user location, and user transactional data;

recording the user personality vector in the user profile;

receiving a first indication for a first chat bot response, wherein the first indication is the user authentication;

determining the first chat bot response, wherein the first chat bot response comprises content that is based on the user profile and a chat bot personality that is based on the user personality vector in the user profile;

sending the first chat bot response to the user;

receiving a first user reply, in response to the first chat bot response;

determining a first user sentiment based on the first user reply by executing a recurrent neural network configured for language processing to detect multiple topics within the first user reply and to assign, for each of multiple topics detected in the first user reply, a respective sentiment score, wherein the respective sentiment score comprises at least one of an opinion classification of negative, positive, or neutral, and an emotion classification;

recording, in the users' sentiment log of the user profile, entries comprising a topic identifier, the sentiment score, and a timestamp, recording the first chat bot response, the first user reply, and the timestamp in the users' chat history log of the user profile; and determining a second chat bot response based at least in part on the recorded sentiment score, wherein responsive to the sentiment score for a topic being negative, the second chat bot response avoids content similar to the first chat bot response for the topic, and responsive to the sentiment score for the topic being positive, the second chat bot response increases content similar to the first chat bot response for the topic.

6. The method according to claim 5, wherein the method further comprises:

providing, to the user, a chat bot personality selection comprising pre-determined chat bot personalities;

receiving, from the user, a selected chat bot personality; and recording, in the user profile, the selected chat bot personality.

7. The method according to claim 5, wherein the training is performed using versioned data snapshots linked to corresponding trained models such that ingestion of new data or an update to the pre-processing triggers generation of an updated model tied to the new data version.

8. The method according to claim 5, wherein the machine-learning framework implements primitives comprising at least tensor convolutions, pooling operations, activation functions, matrix operations, and vector operations.

9. The method according to claim 5, wherein the recurrent neural network comprises a feedback connector configured to communicate parameter data from at least one node of a subsequent hidden layer to at least one node of a previous hidden layer.

10. A system utilizing a machine learning framework for personalizing a chat bot for improved user experience, the system comprising:

at least one processor;

a communication interface communicatively coupled to the at least one processor; and a memory device storing executable code that, when executed, causes the at least one processor to:

train an algorithm, via a machine learning framework and using a set of training data, the algorithm configured to determine user personality, the algorithm comprising:

a front-end convolutional neural network configured for language processing to perform pre-processing and feature recognition on data selected from users' sentiment logs, users' preferences, users' chat history log, users' social media data, users' locations, and users' transactional data, the front-end convolution neural network outputting extracted feature vectors; and a back-end dense neural network configured to receive the extracted feature vectors from the front-end convolution neural network and output a user personality vector comprising numerical rankings of openness, conscientiousness, extroversion, agreeableness, and neuroticism, the back-end dense neural network comprising nodes wherein each node of a previous layer is connected to an associated node of a subsequent layer, and wherein each node of each hidden layer of the back-end dense neural network is associated with an activation function to generate an output received by a corresponding node in a subsequent layer; and the training further comprising:

performing data ingestion and the pre-processing by cleaning and transforming the set of training data, and versioning the set of training data to connect a data snapshot with a resulting trained model;

performing real-time data validation that confirms numerical ranges and category distributions, and upon detection of an anomaly, automatically pauses training without human intervention and issues an alert to an agent;

iteratively predicting the user personality vector based on the set of training data;

testing and comparing the user personality vector predicted during each iteration against a target variable vector and determining an associated error amount for each output data point by comparing the predicted user personality vector against the target variable vector, the associated error amount communicated back through the algorithm as an error signal; and modifying, via a feedback loop, respective weights assigned to each of the nodes associated with each of the set of training data to improve predictability of the ranking of the user personality and terminating the training when the associated error amount for the output data is less than a predetermined acceptable level;

receive a user authentication;

retrieve a user profile, based on the user authentication;

determine a user personality by executing the trained algorithm to generate a user personality vector based on data within the user profile; wherein the user profile comprises: a user sentiment log, user preferences, user chat history, user social media data, user location, and user transactional data;

record the user personality vector in the user profile;

provide, to the user, a chat bot personality selection comprising pre-determined chat bot personalities;

receive, from the user, a user-selected chat bot personality;

record, in the user profile, the user-selected chat bot personality;

receive a first indication for a first chat bot response, wherein the first indication is the user authentication;

determine the first chat bot response, wherein the first chat bot response comprises content that is based on the user profile and a chat bot personality that is based on the user personality vector in the user profile and the user-selected chat bot personality in the user profile;

send the first chat bot response to the user;

receive a first user reply, in response to the first chat bot response;

determine a first user sentiment based on the first user reply by executing a recurrent neural network configured for language processing to detect multiple topics within the first user reply and to assign, for each of multiple topics detected in the first user reply, a respective sentiment score wherein the respective sentiment score comprises at least one of an opinion classification of negative, positive, or neutral, and an emotion classification;

record, in the users' sentiment log of the user profile, entries comprising a topic identifier, the sentiment score, and a timestamp;

record the first chat bot response, the first user reply, and the timestamp in the users' chat history log of the user profile; and determine a second chat bot response based at least in part on the recorded sentiment score, wherein responsive to the sentiment score for a topic being negative, the second chat bot response avoids content similar to the first chat bot response for the topic, and responsive to the sentiment score for the topic being positive, the second chat bot response increases content similar to the first chat bot response for the topic.

11. The system according to claim 10, wherein the training is performed using versioned data snapshots linked to corresponding trained models such that ingestion of new data or an update to the pre-processing triggers generation of an updated model tied to the new data version.

12. The system according to claim 10, wherein the machine-learning framework implements primitives comprising at least tensor convolutions, pooling operations, activation functions, matrix operations, and vector operations.

13. The system according to claim 10, wherein the recurrent neural network comprises a feedback connector configured to communicate parameter data from at least one node of a subsequent hidden layer to at least one node of a previous hidden layer.

* * * * *